(12) United States Patent
Koubi et al.

(10) Patent No.: US 12,539,188 B2
(45) Date of Patent: Feb. 3, 2026

(54) STABILIZER FOR MEDICAL CARTS

(71) Applicant: DIGICUTO, Marseilles (FR)

(72) Inventors: Stefan Koubi, Marseilles (FR); Galip Gurel, Marseilles (FR); Karim Tourbah, Marseilles (FR)

(73) Assignee: DIGICUTO, Marseilles (FR)

( * ) Notice: Subject to any disclaimer, the term of this patent is extended or adjusted under 35 U.S.C. 154(b) by 0 days.

(21) Appl. No.: 19/116,242

(22) PCT Filed: Sep. 29, 2023

(86) PCT No.: PCT/EP2023/077078
§ 371 (c)(1),
(2) Date: Mar. 27, 2025

(87) PCT Pub. No.: WO2024/141188
PCT Pub. Date: Jul. 4, 2024

(65) Prior Publication Data
US 2025/0255691 A1    Aug. 14, 2025

(30) Foreign Application Priority Data
Dec. 29, 2022  (FR) ........................................ 2214665

(51) Int. Cl.
- *A61B 50/13*  (2016.01)
- *A61B 34/30*  (2016.01)
- *A61G 15/14*  (2006.01)
- *B62B 5/04*  (2006.01)

(52) U.S. Cl.
CPC ............. *A61B 50/13* (2016.02); *A61B 34/30* (2016.02); *A61G 15/14* (2013.01); *B62B 5/049* (2013.01)

(58) Field of Classification Search
CPC ......... A61B 34/30; A61B 50/13; A61B 15/14; B62B 5/0433; B62B 5/0457; B62B 5/049
See application file for complete search history.

(56) References Cited

U.S. PATENT DOCUMENTS

| | | | | |
|---|---|---|---|---|
| 2,843,392 A | * | 7/1958 | Simkins | B60B 33/06 280/43.14 |
| 8,006,985 B2 | * | 8/2011 | Facey | B62B 5/0093 280/43.24 |
| 8,511,693 B2 | * | 8/2013 | Gass | B62B 5/0083 280/43.24 |
| 8,621,690 B2 | * | 1/2014 | Hornbach | A61G 7/0528 5/613 |

(Continued)

OTHER PUBLICATIONS

International Search Report (with translation) and Written Opinion (with machine translation) in PCT/EP2023/077078, dated Nov. 13, 2023 (19 pages with translations).

*Primary Examiner* — Katy M Ebner
(74) *Attorney, Agent, or Firm* — Tucker Ellis LLP

(57) ABSTRACT

The invention relates to a stabilization device for medical carts as well as to a movable itinerant robotic dental or medical treatment station.
One of the objectives of this invention is to provide a stabilization device (100) for a medical cart (200).
For this, the inventors propose an easily-actuated mechanical structure and which can be removably mounted or permanently fixed to a floor of the medical cart (200).
In practice, the stabilization device according to the invention comprises ground stabilizing feet (110), a control mechanism (120) and a control transmission mechanism (130).

20 Claims, 6 Drawing Sheets

(56) References Cited

U.S. PATENT DOCUMENTS

| | | | | |
|---|---|---|---|---|
| 10,123,842 B2* | 11/2018 | Iceman | ................... | A61B 34/20 |
| 10,603,119 B2* | 3/2020 | Ross | ...................... | A61B 34/30 |
| 2017/0065354 A1* | 3/2017 | Shiels | .................... | A61B 50/13 |
| 2018/0346008 A1* | 12/2018 | Nahum | ................... | B62B 5/049 |

* cited by examiner

[Fig. 1]
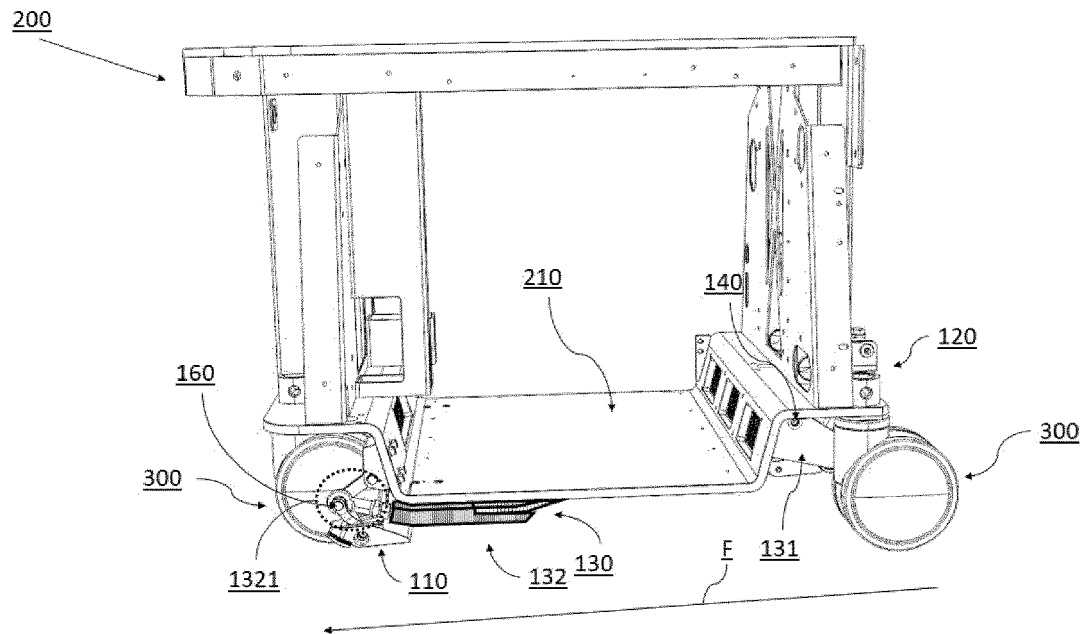
[Fig. 2]
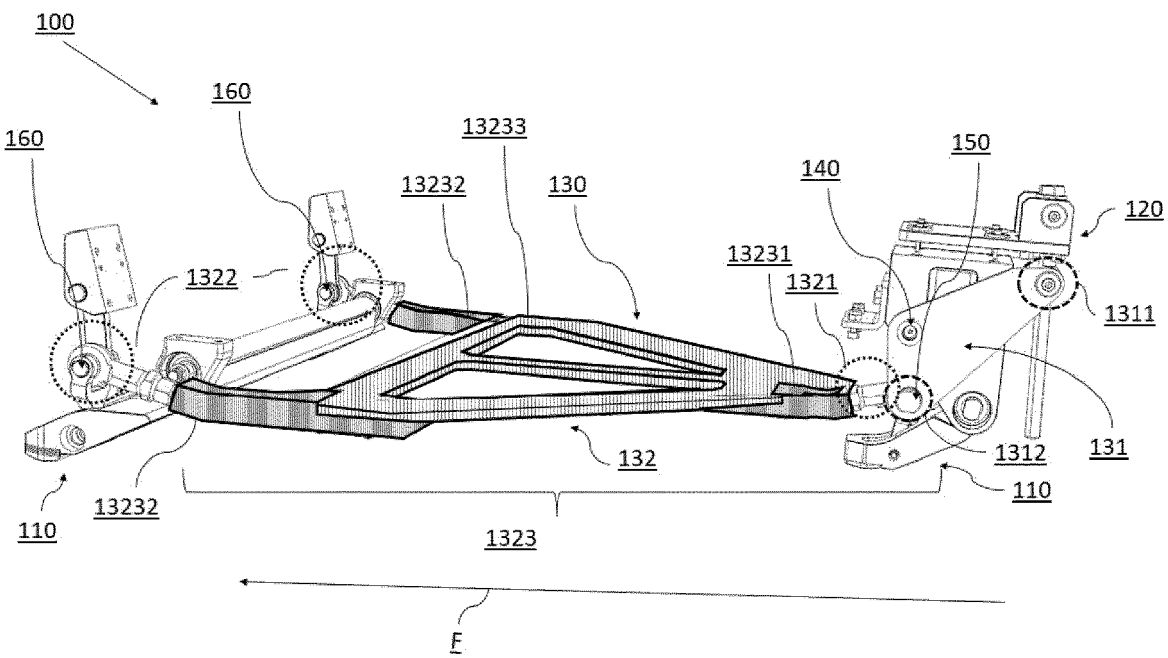

[Fig. 3]
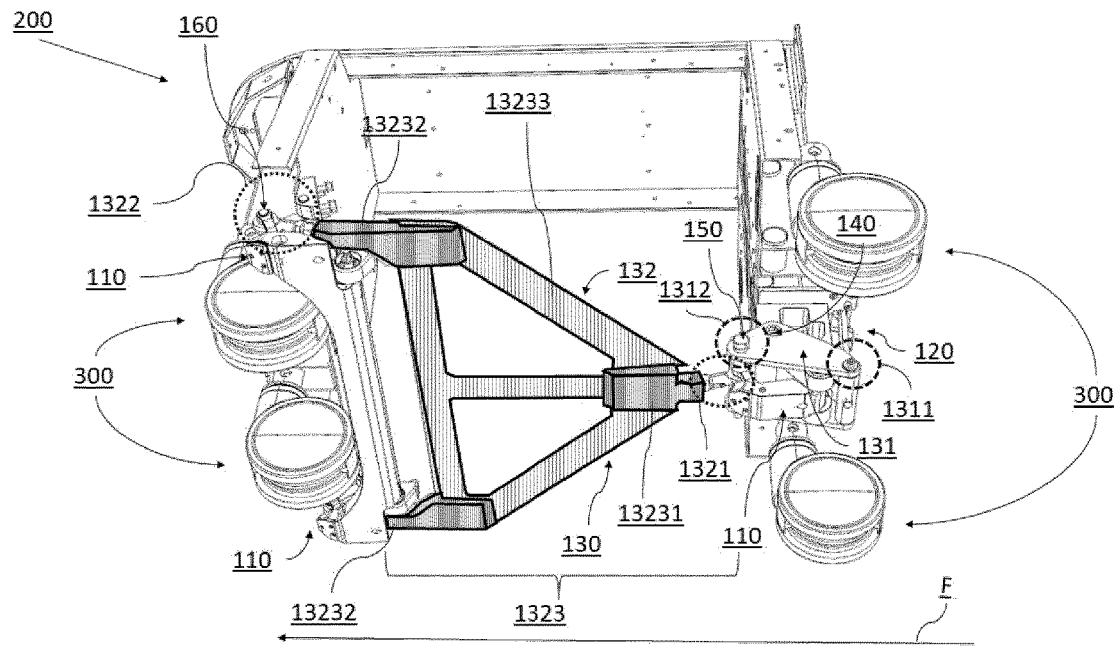
[Fig. 4]
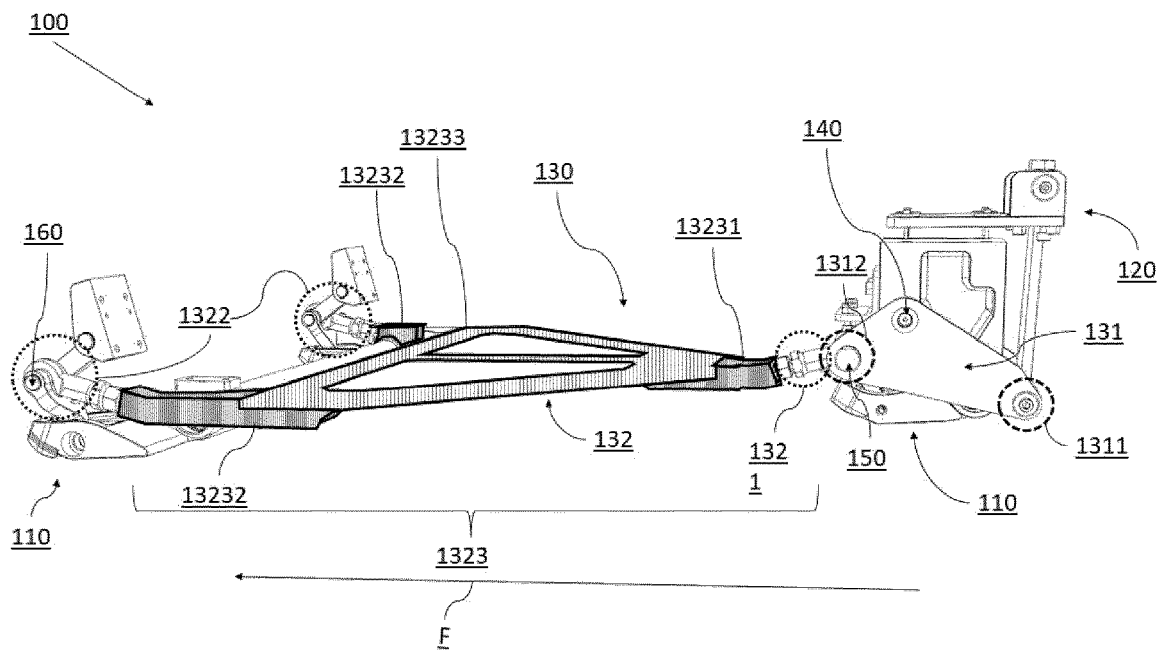

[Fig. 5]
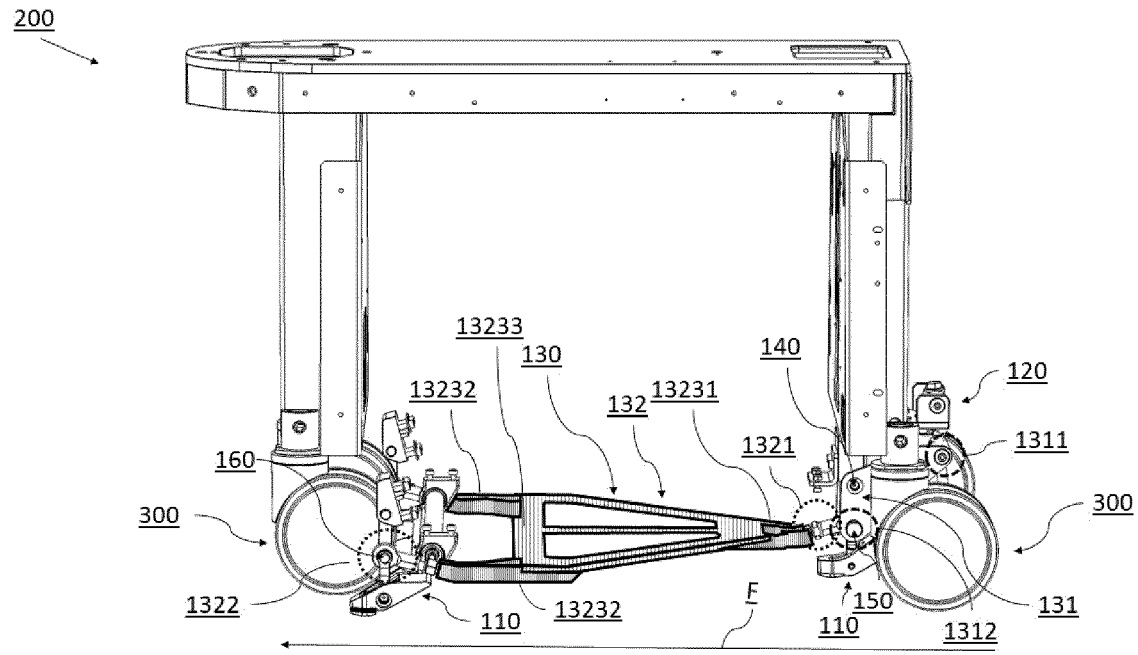
[Fig. 6]
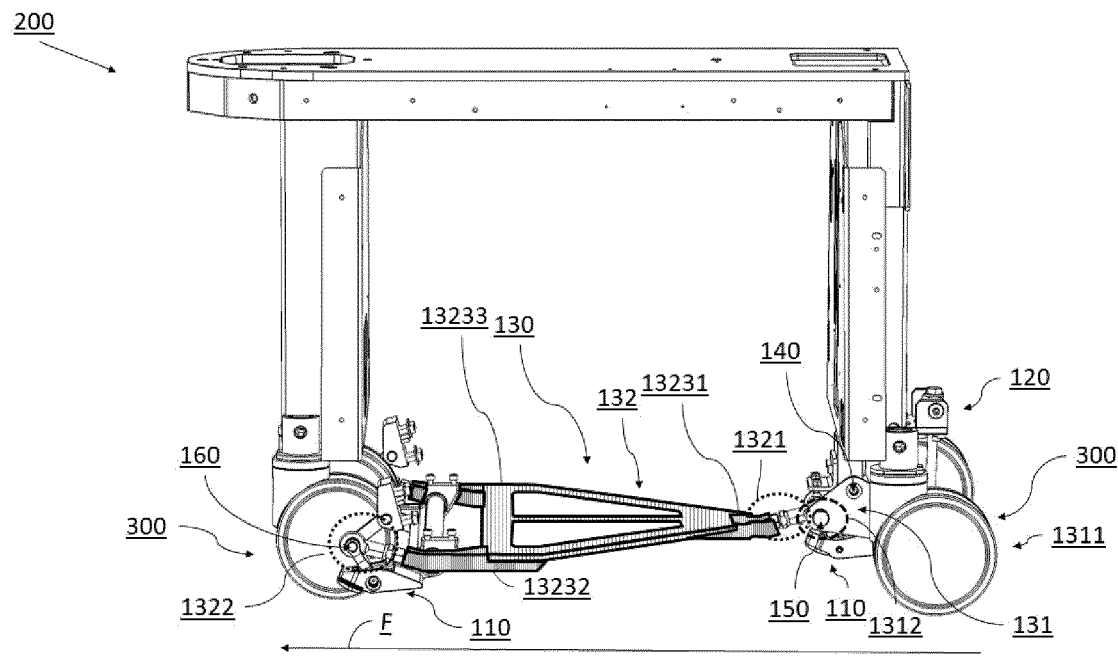

[Fig. 7]
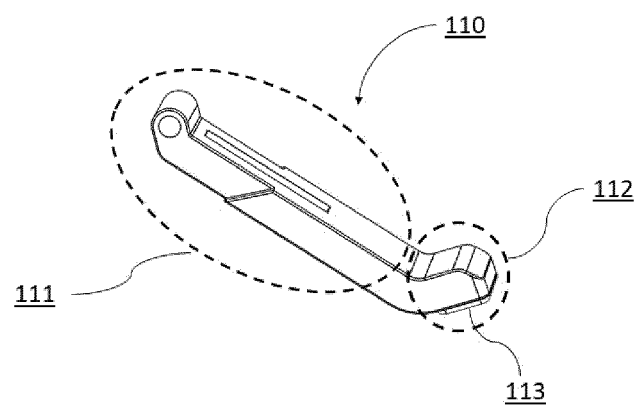
[Fig. 8]
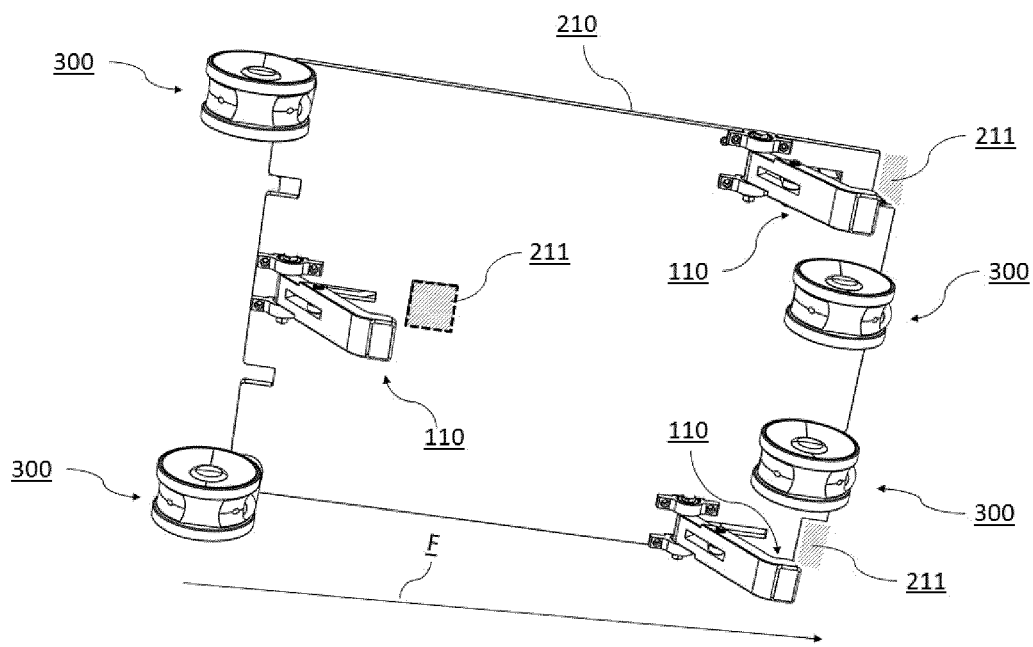

[Fig. 9]
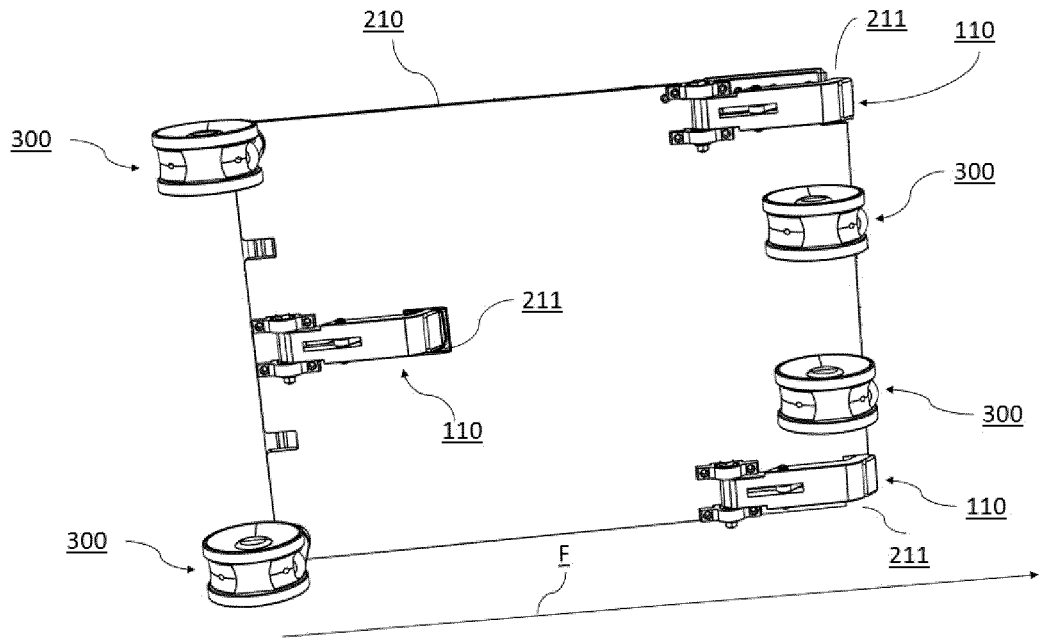
[Fig. 10]
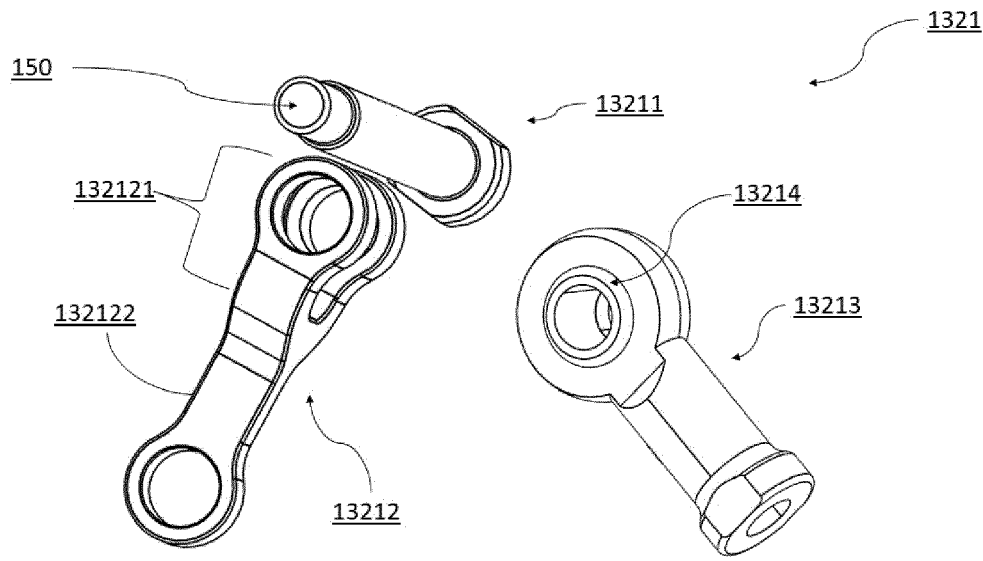

[Fig. 11]
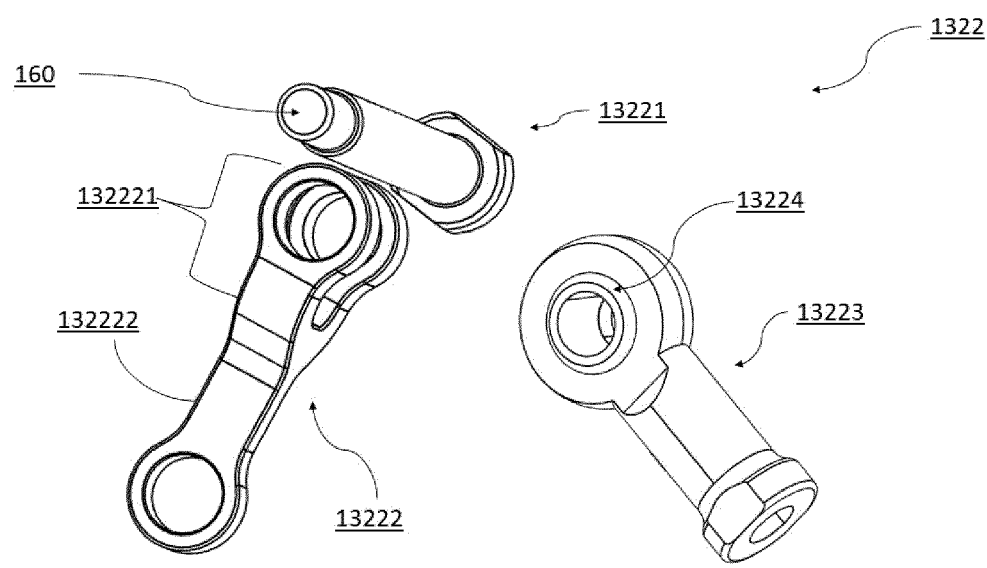

STABILIZER FOR MEDICAL CARTS

TECHNICAL FIELD

The invention relates to the field of medical cart systems. Particularly, it relates to a stabilization device for medical carts as well as a movable itinerant robotic dental or medical treatment station.

Similar devices are known from documents US2018346008A1 and US2017065354A1.

PRIOR ART

In everyday life, dental and medical problems are unfortunately common.

Moreover, if the patients cannot receive appropriate treatments on time, these dental and medical problems can be extremely serious and painful, thus affecting their quality of life and health.

In order to treat the patients more quickly, it is more and more envisaged to use robots in order to assist the practitioners in carrying out dental or medical procedures.

Indeed, thanks to their controllable movements, the robots can not only improve the effectiveness of the dental or medical procedures, but also the effectiveness of the treatment by avoiding or limiting human errors.

Some of these robots are provided to be mounted on medical carts of known type and adapted to travel on the ground.

However, the ground on which a medical cart can travel does not necessarily have a planar surface, so that, when the robot is in operation, there is a risk as to the level of accuracy of the robot's movements, which involves a high risk to patient safety.

Thus, there is a need for a stabilization device for medical carts.

SUMMARY OF THE INVENTION

The invention aims to address, at least partially, this need.

A first aspect of the invention aims a stabilization device for a medical cart comprising a carrier floor frame.

The stabilization device comprises:
ground stabilizing feet which are configured to support the carrier floor frame and which are convertible between a deployed configuration in which the ground stabilizing feet are bearing on the ground, in a stable manner, so as to support, together, all or part of what the carrier floor frame supports, and a folded configuration in which the ground stabilizing feet are off the ground so as to ensure at least partial retraction,
a control mechanism which can be displaced between a first position and a second position, in response to at least one translational movement or one rotational movement, which comprises:
at least a first articulation, with at least one degree of freedom, which is directly connected to the second portion of the control transmission element and to at least a first ground stabilizing foot,
at least a second articulation, with at least one degree of freedom, which is directly connected to at least a second ground stabilizing foot, and
a connection structure which is connected between the first articulation and the second articulation, and
a control transmission mechanism which comprises:
a connection assembly, and
at least one control transmission element which has a first portion of the control transmission element kinematically connected, in a direct or indirect manner, to the control mechanism, and a second portion of the control transmission element kinematically connected, in an articulated manner, to the ground stabilizing feet via the connection assembly, the control transmission element being rotatably mounted about a first axis of rotation so as to be driven in rotation in a first direction of rotation and in a second direction of rotation opposite to the first direction of rotation.

Furthermore, the control transmission mechanism is configured so that the actuation of the control mechanism in the first configuration or in the second configuration drives in rotation the control transmission element about the first axis of rotation, and allows the ground stabilizing feet to alternate between the deployed configuration and the folded configuration.

In a first embodiment, the first articulation comprises:
a first rod which has a second axis of rotation which is substantially parallel to the first axis of rotation of the control transmission element, the first rod being coupled to the second portion of the control transmission element,
a first pivoting head which has a main section which is mounted in rotation on the first rod and an arm section which extends from the main section, the first pivoting head being connected to the first ground stabilizing foot, and
a first ball-joint tip which is mounted in rotation on the first rod and which is connected, immobilized in rotation, to the connection structure.

In a second embodiment, the second articulation comprises:
a second rod which has a third axis of rotation which is substantially parallel to the first axis of rotation of the control transmission element, the second rod being coupled to the carrier floor frame,
a second pivoting head which has a main section which is mounted in rotation on the second rod and an arm section which extends from the main section, the second pivoting head being connected to the second ground stabilizing foot, and
a second ball-joint tip which is mounted in rotation on the second rod and which is connected, immobilized in rotation, to the connection structure.

In a first example of the first embodiment and of the second embodiment, the first ball-joint tip and the second inclined upwards from the connection ball-joint tip are structure to, respectively, the first rod and the second rod.

In a second example of the first embodiment and of the second embodiment, the connection structure comprises:
at least a first end arm which is connected to the first ball-joint tip,
at least a second end arm which is connected to the second ball-joint tip, and
a central body which is connected between the first ball-joint tip and the second ball-joint tip.

In a third embodiment, all or part of the control transmission mechanism is configured to be removably mounted or permanently fixed over the carrier floor frame.

In a fourth embodiment, all or part of the control transmission mechanism is configured to be removably mounted or permanently fixed under the carrier floor frame.

In a fifth embodiment, the ground stabilizing feet are arranged in a triangle between a front part and a rear part of the carrier floor frame.

In a sixth embodiment,
all or part of the ground stabilizing feet have an L shape inclined relative to a longitudinal axis of the carrier floor frame, each with a long branch and a short branch, and
the carrier floor frame has cutouts, each being arranged to receive the short branch of at least one ground stabilizing feet, when the ground stabilizing foot is in the folded configuration.

The invention also relates to a movable itinerant robotic dental or medical treatment station which comprises:
at least one robotic arm which is configured to move at least one dental or medical instrument,
a medical cart which comprises a carrier floor frame, the carrier floor frame:
having a longitudinal axis,
having a front part relative to a direction of displacement of the medical cart and a rear part opposite to the front part, and
being provided with ground connections designed to allow it to move on the ground, and
a stabilization device according to the invention.

In a first embodiment, all or part of the control transmission mechanism of the stabilization device is configured to be removably mounted or permanently fixed under the carrier floor frame.

In a second embodiment, all or part of the control transmission mechanism of the stabilization device is configured to be removably mounted or permanently fixed over the carrier floor frame.

BRIEF DESCRIPTION OF THE DRAWINGS

Other characteristics and advantages of the invention will be better understood upon reading the following description and with reference to the appended drawings, given by way of illustration and without limitation.

FIG. 1 represents a first perspective side view of one embodiment of a medical cart equipped with a stabilization device according to the invention, in the folded configuration of the ground stabilizing feet.

FIG. 2 represents one embodiment of a stabilization device according to the invention, in the deployed configuration of the ground stabilizing feet.

FIG. 3 represents a second perspective bottom view of the medical cart in FIG. 1.

FIG. 4 represents one embodiment of a stabilization device according to the invention, in the folded configuration of the ground stabilizing feet.

FIG. 5 represents a third perspective side view of one embodiment of a medical cart equipped with a stabilization device according to the invention, in the deployed configuration of the ground stabilizing feet.

FIG. 6 represents a fourth perspective side view of one embodiment of a medical cart equipped with a stabilization device according to the invention, in the folded configuration of the ground stabilizing feet.

FIG. 7 represents one embodiment of a ground stabilizing foot.

FIG. 8 represents a perspective bottom view of one variant of the medical cart of FIG. 1 with a particular arrangement of the ground stabilizing feet of FIG. 7, in the deployed configuration.

FIG. 9 represents another perspective bottom view of the variant of the medical cart of FIG. 8 with a particular arrangement of the ground stabilizing feet of FIG. 7, in the folded configuration.

FIG. 10 represents an exploded view of a first articulation of the stabilization device according to the invention.

FIG. 11 represents an exploded view of a second articulation of the stabilization device according to the invention.

The figures do not necessarily respect the scales, in particular in thickness, for illustration purposes.

DESCRIPTION OF THE EMBODIMENTS

One of the objectives of this invention is to provide a stabilization device for medical carts.

For this, the inventors propose an easily-actuated mechanical structure which can be removably mounted or permanently fixed to a floor of the medical cart.

Thus, the invention relates to a stabilization device for a medical cart.

By "cart" it is meant a vehicle or a trailer that a user, generally located behind or next to the cart, propels in one direction of displacement, and which allows transporting materials or goods over short distances. Thus, a "medical" cart (also called "care table" or "care cart") is a cart intended to receive, among other things, the instruments necessary for an act of care or a dental or medical procedure.

In practice, in the invention, as illustrated in FIG. 1, the medical cart 200 comprises a carrier floor frame 210.

The term "frame" in the expression "carrier floor frame" corresponds to a fixed or orientable assembly, which is generally formed of a given material (e.g. metal and/or wood), and which is intended to support the medical cart 200 and what the medical cart 200 transports.

Furthermore, the term "floor" in the expression "carrier floor frame" corresponds to a platform or a substantially horizontal wall which delimits the lower part of the medical cart 200.

Finally, the term "carrier" in the expression "carrier floor frame" corresponds to the fact that the floor can support all or part of the load of the medical cart 200.

Conventionally, as illustrated in FIG. 1, FIG. 8 and FIG. 9, the carrier floor frame 210 extends from upstream to downstream in the direction of arrow F, along a longitudinal axis, between a rear part, and a front part, which is opposite to the rear part.

Furthermore, the carrier floor frame 210 is provided with ground connections 300 which are designed to allow it to move on the ground.

In a first example, as illustrated in FIG. 1, FIG. 3, FIG. 5, FIG. 6, FIG. 8 and FIG. 9, the ground connections 300 are wheels.

In a second example, the ground connections 300 are caterpillars.

However, it could be envisaged to use other types of ground connections 300, without requiring substantial modifications to the invention.

In the invention, as illustrated in FIG. 2 and FIG. 3, the stabilization device 100 comprises ground stabilizing feet 110, a control mechanism 120 and a control transmission mechanism 130.

The term "foot" in the expression "ground stabilizing feet" corresponds to a piece formed of a given material (e.g. metal and/or wood) and which serves to support the medical cart 200 relative to the ground.

In the invention, the ground stabilizing feet 110 are configured to support the carrier floor frame 210.

In a first particular implementation of the ground stabilizing feet 110, as illustrated in FIG. 3, these are arranged in a triangle between a front part and a rear part of the carrier floor frame 210.

In a first example of the first particular implementation of the ground stabilizing feet 110, there are at least one front ground stabilizing foot 110 at the level of the front part of the carrier floor frame 210 and at least two rear ground stabilizing feet 110 at the level of the rear part of the carrier floor frame 210.

In other words, the first example of the first particular implementation of the ground stabilizing feet 110 covers the disposition of one, two or more than two front ground stabilizing feet 110 at the level of the front part of the carrier floor frame 210, and two or more than two rear ground stabilizing feet 110 at the level of the rear part of the carrier floor frame 210.

In one embodiment of the first example of the first particular implementation of the ground stabilizing feet 110, there are at least two front ground connections 300, on either side of the front stabilizing foot, and at least one rear ground connection 300 between the rear ground stabilizing feet 110.

In a second example of the first particular implementation of the ground stabilizing feet 110, as illustrated in FIG. 3, there are at least two front ground stabilizing feet 110 at the level of the front part of the carrier floor frame 210 and at least one rear ground stabilizing foot 110 at the level of the rear part of the carrier floor frame 210.

In other words, the second example of the first particular implementation of the ground stabilizing feet 110 covers the disposition of two or more than two front ground stabilizing feet 110 at the level of the front part of the carrier floor frame 210, and one, two or more than two rear ground stabilizing feet 110 at the level of the rear part of the carrier floor frame 210.

In one embodiment of the second example of the first particular implementation of the ground stabilizing feet 110, there are at least one front ground connection 300 between the front stabilizing feet and at least two rear ground connections 300, on either side of the rear ground stabilizing foot 110.

However, other arrangements of stabilizing feet could be envisaged in combination with different arrangements of ground connections 300, without requiring substantial modifications to the invention.

In a second particular implementation of the ground stabilizing feet 110, these are arranged symmetrically about a longitudinal median axis of the carrier floor frame 210.

In a third particular implementation of the ground stabilizing feet 110, these are arranged symmetrically about an axis which is perpendicular to the longitudinal median axis of the carrier floor frame 210.

In a fourth particular implementation of the ground stabilizing feet 110, at least two ground stabilizing feet 110 are integrally formed.

In other words, the fourth particular implementation of the ground stabilizing feet 110 covers the fact that two or more than two ground stabilizing feet 110 are integrally formed.

In the invention, the ground stabilizing feet 110 are convertible between a deployed configuration and a folded configuration.

In the deployed configuration, as illustrated in FIG. 2 and FIG. 5, the ground stabilizing feet 110 are bearing on the ground, in a stable manner, so as to support, together, all or part of what the carrier floor frame 210 supports.

In one particular implementation of the deployed configuration, the ground stabilizing feet 110 raise the carrier floor frame 210 relative to the ground so that the ground connections 300 are not in contact with the ground and so as to relieve the ground connections 300.

In one example of this particular implementation of the deployed configuration, the ground stabilizing feet 110 raise the carrier floor frame 210 in a range comprised between 1 mm and 20 mm relative to the ground, preferably between 2 mm and 5 mm relative to the ground.

However, it could be envisaged that in the deployed configuration, the ground connections 300 touch the ground, without requiring substantial modifications to the invention.

In the folded configuration, as illustrated in FIG. 1, FIG. 3, FIG. 4 and FIG. 6, the ground stabilizing feet 110 are off the ground so as to ensure at least partial retraction.

By "retraction" it is meant the fact of removing, folding or stowing the ground stabilizing feet 110.

In one particular implementation of the ground stabilizing feet 110, as illustrated in FIG. 7, all or part of these have an L shape inclined relative to the longitudinal axis of the carrier floor frame 210.

Conventionally, each ground stabilizing foot 110 in the shape of an inclined L has a long branch 111 and a short branch 112.

Moreover, in one example as illustrated in FIG. 7, each ground stabilizing foot 110 in the shape of an inclined L comprises a pad 113.

Furthermore, as illustrated in FIG. 8 and FIG. 9, the carrier floor frame 210 has cutouts 211.

In practice, each cutout 211 is arranged to receive the short branch 112 of at least one ground stabilizing foot 110, when the ground stabilizing foot 110 is in the folded configuration.

In the invention, the control mechanism 120 can be displaced between a first position and a second position, in response to at least one translational movement or one rotational movement.

In other words, the control mechanism 120 can be displaced between a first position and a second position, in response to either a translational movement, or a rotational movement, or a combination between one or more translational movements and one or more rotational movements.

In a first example of one implementation of the control mechanism 120, the latter is translated by the actuation of a steering member such as a translative slider.

However, it could be envisaged to use other translation actuation mechanisms of the control mechanism 120, whether they are manually or automatically actuated, without requiring substantial modifications to the invention.

In a second example of one implementation of the control mechanism 120, it is rotated by the actuation of a steering member selected from a rotating steering wheel, a pivoting lever, a pivoting handlebar, a pivoting pedal, a crank, and a rudder.

However, it could be envisaged to use other rotation actuation mechanisms of the control mechanism 120, without requiring substantial modifications to the invention.

Still in the invention, as illustrated in FIG. 1, FIG. 2, FIG. 3, FIG. 4, FIG. 5 and FIG. 6, the control transmission mechanism 130 comprises a connection assembly 132 and at least one control transmission element 131.

In other words, the control transmission mechanism 130 comprises a connection assembly 132 and one, two or more than two control transmission elements 131.

In one particular implementation of the control transmission element 131, as illustrated in FIG. 2, FIG. 3, FIG. 4, FIG. 5 and FIG. 6, this has a first portion 1311 of the control transmission element 131 and a second portion 1312 of the control transmission element 131.

In practice, the first portion 1311 of the control transmission element 131 is kinematically connected, in an direct or indirect manner, to the control mechanism 120.

By "kinematically" it is meant a mode of mechanical connection which allows the description of a kinematic movement, that is to say an angle of rotation, an amplitude of rotation, a vector of displacement, an amplitude of translation, a speed or an acceleration.

Then, the second portion 1312 of the control transmission element 131 is kinematically connected, in an articulated manner, to the ground stabilizing feet 110 via the connection assembly 132.

Furthermore, the control transmission element 131 is rotatably mounted about a first axis of rotation 140 so as to be driven in rotation about the first axis of rotation 140, in a first direction of rotation and in a second direction of rotation opposite to the first direction of rotation.

In one embodiment of the control transmission element 131, it is in the form of at least one plate.

By "plate" it is meant a piece of a generally flat rigid material whose thickness is small, compared to the two other dimensions, whether the cross section is rectilinear or not, for example crenellated or sinusoidal such as a corrugated iron.

In one example, as illustrated in FIG. 2, FIG. 3, FIG. 4, FIG. 5 and FIG. 6, the control transmission element 131 has a triangular shape.

In this example, the first portion 1311 of the control transmission element 131, the second portion 1312 of the control transmission element 131 and the first axis of rotation 140 are respectively disposed at a top of the control transmission element 131 in triangular shape.

However, it can be envisaged to use other geometric shapes (e.g. circular, semi-circular, square, rectangular, frustoconical, conical, polygonal, hexagonal, trapezoidal, elliptical, semi-elliptical, convex, cross and star shape), without requiring substantial modifications to the invention.

In the invention, the control transmission mechanism 130 is configured so that the actuation of the control mechanism 120 in the first configuration or in the second configuration drives in rotation the control transmission element 131 about the first axis of rotation 140, and allows the alternation of the ground stabilizing feet 110 between the deployed configuration and the folded configuration.

By "alternation" it is meant a succession of the state of the ground stabilizing feet 110, in a regular order, in time or space.

FIG. 2 and FIG. 5 illustrate the deployed configuration of the ground stabilizing feet 110.

In this deployed configuration of the ground stabilizing feet 110, the control mechanism 120 has been actuated in the first position so that the control transmission element 131 is driven in the first direction of rotation about the first axis of rotation 140.

In practice, in the example of FIG. 2 and FIG. 5, the first portion 1311 of the control transmission element 131 is in a high position relative to the ground while the second portion 1312 of the control transmission element 131 is in a low position relative to the ground, so that the ground stabilizing feet 110 are bearing on the ground, in a stable manner.

However, it could be envisaged that in the deployed configuration of the ground stabilizing feet 110, the first portion 1311 of the control transmission element 131 is in a low position relative to the ground while the second portion 1312 of the control transmission element 131 is in a high position relative to the ground, without requiring substantial modifications of the invention, so that the ground stabilizing feet 110 are bearing on the ground, in a stable manner.

FIG. 4 and FIG. 6 illustrate the folded configuration of the ground stabilizing feet 110.

In this folded configuration of the ground stabilizing feet 110, the control mechanism 120 has been actuated in the second position so that the control transmission element 131 is driven in the second direction of rotation about the first axis of rotation 140.

In practice, in the example of FIG. 4 and FIG. 6, the first portion 1311 of the control transmission element 131 is in the low position relative to the ground while the second portion 1312 of the control transmission element 131 is in a high position relative to the ground, so that the ground stabilizing feet 110 are off the ground.

However, it could be envisaged that in the folded configuration of the ground stabilizing feet 110, the first portion 1311 of the control transmission element 131 is in the high position relative to the ground while the second portion 1312 of the control transmission element 131 is in a low position relative to the ground, without requiring substantial modifications to the invention, so that the ground stabilizing feet 110 are off the ground.

Still in the invention, in one particular implementation of the connection assembly 132, as illustrated in FIG. 1, FIG. 2, FIG. 3, FIG. 4, FIG. 5 and FIG. 6, the latter comprises at least two articulations, namely at least a first articulation 1321, with at least a single degree of freedom, and at least a second articulation 1322, with at least a single degree of freedom, and a connection structure 1323.

In other words, in this particular implementation of the connection assembly 132, the latter comprises a connection structure 1323, one, two or more than two first articulations 1321, with one, two, or more than two degrees of freedom, and one, two, or more than two second articulations 1322, with one, two, or more than two degrees of freedom.

By "articulation" it is meant a connecting element for mechanical pieces which allows one or more independent relative movements of the mechanical pieces relative to each other.

By "degree of freedom" it is meant the fact that the first articulation 1321 and the second articulation 1322 authorize one, two or more than two relative movements independent of the mechanical pieces that they connect.

In a first example, the first articulation 1321 and/or the second articulation 1322 are slide connections.

In a second example, the first articulation 1321 and/or the second articulation 1322 are helical slide connections.

In a third example, the first articulation 1321 and/or the second articulation 1322 are pivot connections.

In a fourth example, the first articulation 1321 and/or the second articulation 1322 are sliding pivot connections.

In a fifth example, the first articulation 1321 and/or the second articulation 1322 are ball-joint connections.

In a sixth example, the first articulation 1321 and/or the second articulation 1322 are pin ball-joint connections.

In the particular implementation of the connection assembly 132, the first articulation 1321 is directly connected to the second portion 1312 of the control transmission element 131 and to at least a first ground stabilizing foot 110.

In other words, in this particular implementation of the connection assembly 132, the first articulation 1321 is directly connected to the second portion 1312 of the control transmission element 131 and to one, two or more than two first ground stabilizing feet 110.

In a first embodiment of the particular implementation of the connection assembly 132, as illustrated in FIG. 10, the first articulation 1321 comprises a first rod 13211, a first pivoting head 13212 and a first ball-joint tip 13213 mounted around a ball-joint 13214.

By "rod" it is meant a piece, of constant or variable section, which has an elongation in one direction and which can be inscribed in a cylinder or a prism of a desired length and of a desired diameter.

By "ball-joint tip" (also known as "tip bearing") it is meant a mechanical component formed of a tip and of a ball-joint and which makes it possible to establish a connection between at least two fixed or movable elements. A ball-joint tip is generally used to provide a rotational and oscillating movement without any clearance. A ball-joint tip is also used to transmit the pull and push of connections and lever arms. The ball-joint tips are generally used on the ends of the hydraulic or pneumatic pistons or at the base of the hydraulic cylinders.

In the first embodiment of the particular implementation of the connection assembly 132, as illustrated in FIG. 10, the first rod 13211 has a second axis of rotation 150 which is substantially parallel to the first axis of rotation 140 of the control transmission element 131.

Furthermore, the first rod 13211 is coupled to the second portion 1312 of the control transmission element 131.

Still in the first embodiment of the particular implementation of the connection assembly 132, the first pivoting head 13212 is Y-shaped and has a main section 132121 which is mounted in rotation on the first rod 13211, as well as a first arm section 132122 which extends from the main section 132121.

Furthermore, the first pivoting head 13212 is connected to the first ground stabilizing feet 110 via the first arm section 132122.

In one example, the first arm section 132122 of the first pivoting head 13212 is pivotally connected to the first ground stabilizing foot 110.

However, it could be envisaged to use other connections, without requiring substantial modifications to the invention.

Finally, in the first embodiment of the particular implementation of the connection assembly 132, the first ball-joint tip 13213 is, on the one hand, mounted in rotation on the first rod 13211. On the other hand, the first ball-joint tip 13213 is connected, immobilized in rotation, to the connection structure 1323.

In one aspect of the first embodiment of the particular implementation of the connection assembly 132, the first ball-joint tip 13213 is inclined upwards from the connection structure 1323 to the first rod 13211.

In one example of the aspect of the first embodiment of the particular implementation of the connection assembly 132, the first ball-joint tip 13213 is inclined by a predetermined angle of inclination which is comprised between 10° and 20°.

However, depending on the needs, other values can be envisaged, without requiring substantial modifications to the invention.

Still in the particular implementation of the assembly 132, the second articulation 1322 is connection directly connected to at least a second ground stabilizing foot 110.

In other words, in this particular implementation of the connection assembly 132, the second articulation 1322 is directly connected to one, two or more than two second ground stabilizing feet 110.

In a second embodiment of the particular implementation of the connection assembly 132, as illustrated in FIG. 11, the second articulation 1322 comprises a second rod 13221, a second pivoting head 13222 and a second ball-joint tip 13223 mounted about a ball-joint 13224.

In the second embodiment of the particular implementation of the connection assembly 132, the second rod 13221 has a third axis of rotation 160 which is substantially parallel to the first axis of rotation 140 of the control transmission element 131.

Furthermore, the second rod 13221 is coupled to the carrier floor frame 210.

Still in the second embodiment of the particular implementation of the connection assembly 132, the second pivoting head 13222 is Y-shaped and has a main section 132221 which is mounted in rotation on the second rod, as well as a second arm section 132222 which extends from the main section 132221.

Furthermore, the second pivoting head 13222 is connected to the second ground stabilizing foot 110 via the second arm section 132222.

In one example, the second arm section 132222 of the second pivoting head 13222 is pivotally connected to the second ground stabilizing foot 110.

However, it could be envisaged to use other connections, without requiring substantial modifications to the invention.

Finally, in the second embodiment of the particular implementation of the connection assembly 132, the second ball-joint tip 13223 is, on the one hand, mounted in rotation on the second rod 13221. On the other hand, the second ball-joint tip 13223 is connected, immobilized in rotation, to the connection structure 1323.

In one aspect of the second embodiment of the particular implementation of the connection assembly 132, the second ball-joint tip 13223 is inclined upwards from the connection structure 1323 to the second rod 13221.

In one example of the aspect of the second embodiment of the particular implementation of the connection assembly 132, the second ball-joint tip 13223 is inclined by a predetermined angle of inclination which is comprised between 10° and 20°.

However, depending on the needs, other values could be envisaged, without requiring substantial modifications to the invention.

Finally, in the particular implementation of the connection assembly 132, the connection structure 1323 is directly connected between the first articulation 1321 and the second articulation 1322.

In one embodiment of the particular implementation of the connection assembly 132, the connection structure 1323 comprises at least a first end arm 13231, at least a second end arm 13232 and a central body 13233.

In other words, in this embodiment of the particular implementation of the connection assembly 132, the connection structure 1323 comprises a central body 13233, one, two or more than two first end arms 13231, and one, two or more than two second end arms 13232.

In practice, the first end arm 13231 is connected to the first ball-joint tip 13213, the second end arm 13232 is connected to the second ball-joint tip 13223, and the central body 13233 is connected between the first ball-joint tip 13213 and the second ball-joint tip 13223.

In one example of the central body 13233, as illustrated in FIG. 2, FIG. 3, FIG. 4, FIG. 5 and FIG. 6, it has a triangular shape.

However, it could be envisaged to use other geometric shapes (e.g. square, rectangular, polygonal, hexagonal, trapezoidal, cross and star shape), without requiring substantial modifications to the invention.

The invention also relates to a movable itinerant robotic dental or medical treatment station.

Particularly, the movable itinerant robotic dental or medical treatment station comprises at least one robotic arm, one medical cart 200 and one stabilization device 100, according to the invention.

In other words, the movable itinerant robotic dental or medical treatment station comprises a medical cart 200 and a stabilization device 100, according to the invention and one, two or more than two robotic arms.

In practice, the robotic arm is configured to move at least one dental or medical instrument.

In other words, the robotic arm is configured to move one, two or more than two dental or medical instruments.

Finally, the medical cart 200 comprises a carrier floor frame 210 which has a longitudinal axis F, and which has a front part relative to a direction of displacement of the medical cart 200 and a rear part opposite to the front part, and being provided with ground connections 300 designed to move on the ground.

With such a movable itinerant robotic dental or medical treatment station, when the ground stabilizing feet 110 are in the deployed configuration, the movable itinerant robotic dental or medical treatment station is immobilized in a stable manner so that the robotic arm is in a working disposition for moving the dental or medical instrument.

Furthermore, when the ground stabilizing feet 110 are in the folded configuration, the movable itinerant robotic dental or medical treatment station is movable on the ground so that the robotic arm is in a resting disposition, without displacement of the dental or medical instrument.

In a first particular implementation of the movable itinerant robotic dental or medical treatment station, all or part of the control transmission mechanism 130 is configured to be removably mounted or permanently fixed over the carrier floor frame 210.

In a second particular implementation of the movable itinerant robotic dental or medical treatment station, as illustrated in FIG. 1, FIG. 3, FIG. 5 and FIG. 6, all or part of the control transmission mechanism 130 is configured to be removably mounted or permanently fixed under the carrier floor frame 210.

the invention has been described and illustrated. However, the invention is not limited to the embodiments that have been presented. Indeed, numerous combinations of the variants, alternatives, embodiments and implementations can be envisaged without requiring substantial modifications to the invention. Thus, an expert in the field can deduce other variants, alternatives, embodiments and implementations, upon reading the description and the appended figures and depending on the economic, ergonomic and dimensional constraints to be met.

The invention may be the subject of numerous variants and applications other than those described above. Particularly, unless otherwise indicated, the different structural and functional characteristics of each particular implementation described above should not be considered as combined and/or closely and/or inextricably related to each other but, on the contrary, as simple juxtapositions. Furthermore, the structural and/or functional characteristics of the different embodiments described above may be the subject in whole or in part of any different juxtaposition or any different combination.

The invention claimed is:

1. A stabilization device for a medical cart comprising a carrier floor frame, the stabilization device comprising:
   ground stabilizing feet which are configured to support the carrier floor frame and which are convertible between a deployed configuration in which the ground stabilizing feet are bearing on the ground, in a stable manner, so as to support, together, all or part of what the carrier floor frame supports, and a folded configuration in which the ground stabilizing feet are off the ground so as to ensure an at least partial retraction,
   a control mechanism which can be displaced between a first position and a second position, in response to at least one translational movement or at least one rotational movement, and
   a control transmission mechanism which comprises:
      a connection assembly which comprises:
         at least a first articulation, with at least one degree of freedom, which is directly connected to a second portion of a control transmission element and to a first one of said ground stabilizing feet,
         a second articulation, with at least one degree of freedom, which is directly connected to a second one of said ground stabilizing feet, and
         a connection structure which is connected between the first articulation and the second articulation, and
      said control transmission element having a first portion of the control transmission element kinematically connected, in a direct or indirect manner, to the control mechanism, and the second portion of the control transmission element kinematically connected, in an articulated manner, to the ground stabilizing feet via the connection assembly, the control transmission element being rotatably mounted about a first axis of rotation so as to be driven in rotation in a first direction of rotation and in a second direction of rotation opposite to the first direction of rotation,
   wherein,
   the control transmission mechanism is configured so that the actuation of the control mechanism in the first position or in the second position drives in rotation the control transmission element about the first axis of rotation, and allows the ground stabilizing feet to alternate between the deployed configuration and the folded configuration.

2. The stabilization device according to claim 1, wherein the first articulation comprises:
   a first rod which has a second axis of rotation which is substantially parallel to the first axis of rotation of the control transmission element, the first rod being coupled to the second portion of the control transmission element,
   a first pivoting head which has a main section which is mounted in rotation on the first rod and a first arm section which extends from the main section, the first pivoting head being connected to the first ground stabilizing foot, and
   a first ball-joint tip which is mounted in rotation on the first rod and which is connected, immobilized in rotation, to the connection structure.

3. The stabilization device according to claim 2, wherein the second articulation comprises:
   a second rod which has a third axis of rotation which is substantially parallel to the first axis of rotation of the control transmission element, the second rod being configured to be coupled to the carrier floor frame,
   a second pivoting head which has a main section which is mounted in rotation on the second rod and a second arm section which extends from the main section, the second pivoting head being connected to the second ground stabilizing foot, and a second ball-joint tip which is mounted in rotation on the second rod and which is connected, immobilized in rotation, to the connection structure.

4. The stabilization device according to claim 3, wherein the first ball-joint tip and the second ball-joint tip are inclined upwards from the connection structure to, respectively, the first rod and the second rod.

5. The stabilization device according to claim 3, wherein the connection structure comprises:
a first end arm which is connected to the first ball-joint tip,
a second end arm which is connected to the second ball-joint tip, and
a central body which is connected between the first ball-joint tip and the second ball-joint tip.

6. The stabilization device according to claim 1, wherein all or part of the control transmission mechanism is configured to be removably mounted or permanently fixed over the carrier floor frame.

7. The stabilization device according to claim 1, wherein all or part of the control transmission mechanism is configured to be removably mounted or permanently fixed under the carrier floor frame.

8. The stabilization device according to claim 1, wherein the ground stabilizing feet are configured to be arranged in a triangle between a front part and a rear part of the carrier floor frame.

9. The stabilization device according to claim 1, wherein all or part of the ground stabilizing feet have an L shape inclined relative to a longitudinal axis of the carrier floor frame, each with a long branch and a short branch, and
the carrier floor frame has cutouts, each being arranged to receive the short branch of a said ground stabilizing foot when the said ground stabilizing foot is in the folded configuration.

10. A movable itinerant robotic dental or medical treatment station comprising:
a robotic arm which is configured to move a dental or medical instrument,
a medical cart which comprises a carrier floor frame, the carrier floor frame,
having a longitudinal axis, F,
having a front part relative to a direction of displacement of the medical cart and a rear part opposite to the front part, and
being provided with ground connections adapted to allow the medical cart to move on the ground, and
the stabilization device according to claim 1.

11. The movable itinerant robotic dental or medical treatment station according to claim 10, wherein all or part of the control transmission mechanism of the stabilization device is configured to be removably mounted or permanently fixed under the carrier floor frame.

12. The movable itinerant robotic dental or medical treatment station according to claim 10, wherein all or part of the control transmission mechanism of the stabilization device is configured to be removably mounted or permanently fixed over the carrier floor frame.

13. The stabilization device according to claim 3, wherein the connection structure comprises:
a first end arm which is connected to the first ball-joint tip,
a second end arm which is connected to the second ball-joint tip, and
a central body which is connected between the first ball-joint tip and the second ball-joint tip.

14. The stabilization device according to claim 13, wherein the ground stabilizing feet are configured to be arranged in a triangle between a front part and a rear part of the carrier floor frame.

15. The stabilization device according to claim 14, wherein all or part of the control transmission mechanism is configured to be removably mounted or permanently fixed over the carrier floor frame.

16. The stabilization device according to claim 14, wherein all or part of the control transmission mechanism is configured to be removably mounted or permanently fixed under the carrier floor frame.

17. The stabilization device according to claim 3, wherein the ground stabilizing feet are configured to be arranged in a triangle between a front part and a rear part of the carrier floor frame.

18. The stabilization device according to claim 5, wherein the ground stabilizing feet are configured to be arranged in a triangle between a front part and a rear part of the carrier floor frame.

19. The stabilization device according to claim 6, wherein the ground stabilizing feet are configured to be arranged in a triangle between a front part and a rear part of the carrier floor frame.

20. The stabilization device according to claim 7, wherein the ground stabilizing feet are configured to be arranged in a triangle between a front part and a rear part of the carrier floor frame.

* * * * *